Feb. 8, 1938. P. C. SCHMIDT 2,107,550
NUT LOCK
Filed Oct. 22, 1934

INVENTOR
Paul C. Schmidt

Patented Feb. 8, 1938

2,107,550

UNITED STATES PATENT OFFICE 2,107,550

NUT LOCK

Paul C. Schmidt, Nutley, N. J.

Application October 22, 1934, Serial No. 749,395

2 Claims. (Cl. 151—26)

This invention relates to improvements in nut locks, the object of the invention being to provide a device of this character which is of an extremely simple construction, which may be applied to a nut of any formation, which does not injure the threads of the bolt, which is self-contained and will be used like an ordinary nut, which has the greatest resistance at the beginning of the unscrewing movement, and which will perform its function with ease and with accuracy, as described in the following specification, having reference to the accompanying drawing, in which.

Similar numerals refer to similar parts in each of the several views.

Figure 1:
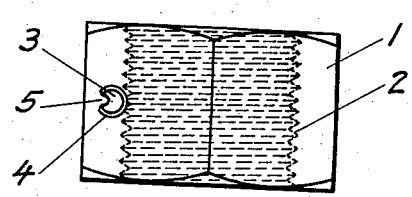
Fig. 1 is a side elevation of the nut embodying my invention.
Figure 2:
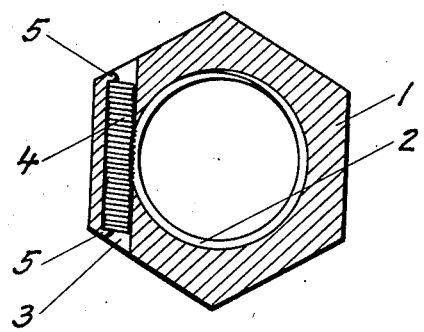
Fig. 2 is a sectional view of the nut embodying my invention.
Figure 3:
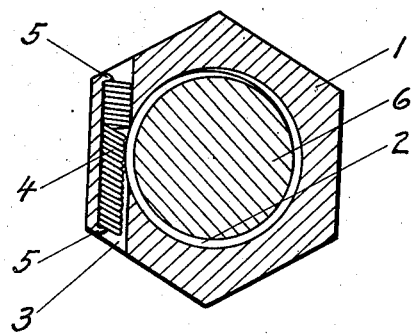
Fig. 3 is a sectional view of the nut in connection with a bolt, embodying my invention.
Figure 4:
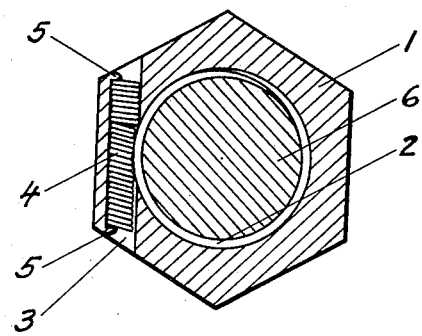
Fig. 4 is another sectional view of the nut in connection with a bolt, showing the jamming position of the locking member after the unscrewing of the nut has been started.

In Figures 1 and 2 of the drawing, numeral 1 designates an ordinary nut, having its thread 2 partially intersected by a hole 3. A locking member 4 is inserted into said hole and held in place by obstructions 5. Referring to Figures 3 and 4, the nut is shown in connection with a bolt 6.

It is evident that when the nut is being screwed to a bolt, the nut turns easily as the protruding coils of the locking member lean against the threads of the bolt, as shown in Fig. 3. But as soon as the rotation of the nut is reversed, one or more coils of the locking member jam against the threads of the bolt and form a wedge between nut and bolt, as shown in Fig. 4. Being resilient, the wedging coils are compressed when sufficient force with a wrench is applied to unscrew the nut, the said coils then change their position in relation to the threads of the bolt and the nut may easily be removed from the bolt after the wedging action ceases. Numerous tests have proven the absolute dependability of the device. For the proper functioning of the locking device it is of vital importance that the spring is held in such a manner that the side, which is in contact with the threads of the bolt, is free to move longitudinally as required by the tilting of the coils, while the opposite side is held between the obstructions or supports, as shown in Figures 3 and 4. It is the novel method of holding the locking member which makes this type of nut lock operative.

From the above description, taken in connection with the accompanying drawing, the extreme simplicity of the device, as well as the advantages thereof, will, it is thought, commend themselves to those skilled in the art to which such inventions appertain, and while I have illustrated and described the preferred embodiment of the improvement, as it now appears to me, changes in the minor details of construction, as to size, shape, proportion, arrangement, etc., which fall within the scope of the appended claims, may be made if desired.

What I claim is:

1. In a lock nut, a threaded nut having a bore extending transversely of the threads of the nut and having open ends, one side of the bore intersecting a portion of the threads of the nut, obstruction means formed solely upon the wall of the bore opposite the threads of the nut, said obstructions being positioned adjacent respective ends of the bore, a coiled spring within the bore normally of a length greater than the length of the bore and extending across and intersecting the threads of the nut, the ends of the spring having seating engagement with respective obstructions whereby to confine and hold the coils of the spring under compression.

2. In a nut lock, a threaded nut having an aperture extended through the nut and intersecting a portion of the threads of the nut, a closely wound coil spring within the aperture, and obstruction means formed solely upon the wall at respective ends of the aperture opposite the threads of the nut for retention of the spring.

PAUL C. SCHMIDT.